US006516135B1

United States Patent
Higuchi et al.

(10) Patent No.: US 6,516,135 B1
(45) Date of Patent: Feb. 4, 2003

(54) COMPRESSED VIDEO DATA PROCESSING WITH CONVERSION OF IMAGE COMPRESSION FORMAT

(75) Inventors: Masataka Higuchi, Osaka (JP); Shigeatsu Asari, Hannan (JP); Seigo Asada, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/945,923

(22) PCT Filed: Oct. 4, 1996

(86) PCT No.: PCT/JP96/02894
§ 371 (c)(1),
(2), (4) Date: Nov. 21, 1997

(87) PCT Pub. No.: WO97/13371
PCT Pub. Date: Apr. 10, 1997

(30) Foreign Application Priority Data

Oct. 6, 1995 (JP) .............................. 7/260347
Dec. 6, 1995 (JP) .............................. 7/317790

(51) Int. Cl.$^7$ .............................................. H04N 5/917
(52) U.S. Cl. ...................... 386/112; 386/124; 386/131; 725/92; 725/115
(58) Field of Search ........................... 386/131, 46, 52, 386/68, 112, 124; 225/89, 91, 115, 95, 134, 98, 94, 92; 348/453–459; 725/115, 92; H04N 5/917

(56) References Cited

U.S. PATENT DOCUMENTS

| 4,506,387 | A | * | 3/1985 | Walter .......................... 725/91 |
| 5,130,792 | A | * | 7/1992 | Tindell et al. ............... 725/134 |
| 5,337,089 | A | * | 8/1994 | Fisch .......................... 348/448 |
| 5,522,041 | A | * | 5/1996 | Murakami et al. ........... 709/203 |
| 5,535,209 | A | * | 7/1996 | Glaser et al. ................. 725/98 |
| 5,550,863 | A | * | 8/1996 | Yurt et al. ..................... 725/91 |
| 5,677,738 | A | * | 10/1997 | Mizutani et al. ............ 348/458 |
| 5,715,104 | A | * | 2/1998 | Takada et al. ................ 360/15 |
| 5,734,787 | A | * | 3/1998 | Yonemitsu et al. ......... 386/111 |
| 6,188,428 | B1 | * | 2/2001 | Koz et al. .................... 725/115 |

FOREIGN PATENT DOCUMENTS

| JP | 7-143475 | 6/1995 |
| WO | 93 16557 | 8/1993 |

OTHER PUBLICATIONS

Visual Communication and Image Processing, Nov. 11, 1991, vol. 1605, No. 2/2, Boston, MS, US, pp. 886–893, "Cheops: a Modular Process for Scalable Video Coding".

(List continued on next page.)

*Primary Examiner*—Vincent Boccio
(74) *Attorney, Agent, or Firm*—Wenderoth, Lind & Ponack, L.L.P.

(57) ABSTRACT

A local server records compressed digital video data according to a first image compression format at normal and four times speeds, while a main server records compressed digital video data according to a second image compression format at normal speed. An image format converter is provided between the local and main servers. The image format converter converts compressed digital video data according to the first image compression format output at normal speed from the local server to compressed digital video data according to the second image compression format to be sent to the main server. The image format converter also converts compressed digital video data according to the second image compression format output at normal speed from the main server to compressed digital video data according to the first image compression format to be sent to the local server. Then, compressed digital video data can be input and output at a high speed when digital video data compressed are recorded after the image conversion format is changed and compressed digital video data are output for reproduction after the image conversion format is changed.

18 Claims, 10 Drawing Sheets

OTHER PUBLICATIONS

SMPTE Journal, vol. 102, No. 12, Dec. 1993, White Plains, NY, US, pp. 1120–1124, "Design Considerations for Serial Digital Television Systems".

18th Int. Television Symposium and Technical Exhibition, Jun. 10, 1993, Montreux, CH, pp. 613–637, "On Air Automation, Cart Machines and Live Presentations, how does that fit?".

IBC, Sep. 14, 1995, pp. 488–493, "DVCPRO: Playing to the Strengths of Tape".

Better Video Images, 1989, SMPTE, pp. 159–169, "Reducing Financial Aliasing in HDTV Production".

SMPTE Journal, vol. 104, No. 9, Sep. 1995, White Planes, NY, US, pp. 582–587, "Designing a Digital Facility: a Case Study".

* cited by examiner

COMPRESSED VIDEO DATA PROCESSING WITH CONVERSION OF IMAGE COMPRESSION FORMAT

TECHNICAL FIELD

The present invention relates to a system which processes compressed video data of different compression formats and to an apparatus for recording and reproducing compressed video signals of different compression formats.

BACKGROUND ART

In a television broadcasting station, digital video cassette recorders are used by reporters to gather news materials or the like. Then, records in the digital video cassette recorders are reviewed and edited for broadcasting.

The records are transferred to a server including a hard disk or the like having a high storage capacity. Once the data are stored in the server, they can be assessed by any computer connected to the server. It is desired in a television broadcasting station to broadcast the latest news. Therefore, it is required to transfer the records gathered in the recorder to the server as fast as possible.

Video data without compression can be transmitted between a digital video cassette recorder and a server. On the other hand, when compressed video data are transmitted, the data can be transferred if the data compression format of the digital video cassette recorder is the same as that of the main server. However, the compression format of video data such as DV format of a digital If video cassette recorder is usually different from the compression format of a server having a format such as MPEG standard. Therefore, a format converter for converting data compression format is needed between the digital video cassette recorder and the server. However, if the transfer speed of the server is normal speed, the compressed digital video data can be transferred only at the normal speed from the digital video cassette recorder. Therefore, speed cannot be increased even if the recorder can reproduce the data at a faster speed. It is desirable to construct a system which can deal with video data at a fast speed even if various data compression formats are used therein.

SUMMARY OF THE INVENTION

An object of the present invention is to provide a compressed video data processing system and an apparatus therefor which can satisfy compatibility of compressed digital video data of two or more different image compression formats.

Another object of the present invention is to provide a compressed video data processing system and an apparatus therefor which can record or reproduce compressed video data at a high speed even if conversion between two or more different image compression formats are processed.

In one aspect of the invention, a compressed video data processing system comprises a digital video cassette recorder for recording and reproducing video data according to a first image compression format, a first recording and reproducing device as a local server, and an image format converter connected between the digital video cassette recorder and the first recording and reproducing device. Further, the first recording and reproducing device as a local server is connected to a second recording and reproducing device as a main server. The first and second recording and reproducing devices record and reproduce compressed digital video data according to a second image compression format different from the first image compression format. The image format converter converts compressed digital video data between the first image compression format and the second image compression format. The second recording and reproducing device may be accessed by computers through a network. By providing the first recording and reproducing device between the image format converter and the second recording and reproducing device, the second recording and reproducing device can operate normally even when accessed by many computers.

In another aspect of the invention, a compressed video data processing system comprises a digital video cassette recorder, a first recording and reproducing device as a local server connected to the digital video cassette recorder, a second recording and reproducing device as a main server, an image format converter connected between the first and second recording and reproducing device. The digital video cassette recorder and the first recording and reproducing device record and reproduce video data according to a first image compression format, while the second recording and reproducing device record and reproduce video data according to a second image compression format. The image format converter converts compressed digital video data between the first and second image compression formats. Compressed video data are transferred between the digital video cassette recorder and the first recording and reproducing device at a first transfer speed, while compressed digital video data are transferred in a network transmission format between the first and second recording and reproducing devices through the image format converter at a second transfer speed. The first recording and reproducing apparatus can record and reproduce data at either of the first and second transfer speeds. Then, even if video data of the first and second image compression formats are not compatible with each other, compressed digital video data according to the first image compression format can be converted to those according to the second one, and vice versa. Thus, video data of different compression formats can be used easily in a single system. The first transfer speed can be determined independently of the second transfer speed. It is preferable that the second transfer speed is faster than the first transfer speed in order to transfer the data in the digital video cassette recorder at a high transfer speed in a form accessed in the first recording reproducing device.

Preferably, the image format converter may support a plurality of conversion processes between the first image compression format and one of a plurality of the second image compression formats for the main server. In the image format converter, a format detector detects the second image compression format and selects one of the conversion processes automatically according to the second image compression format detected by the image format converter. Thus, a user can use video data without knowing the image compression format.

In order to support a plurality of the first image compression formats, a plurality of combinations of the first recording and reproducing device and the compression format converter are preferably provided, each of the combinations corresponding to one of the plurality of the first image compression formats. Then, compressed digital video data according to the first image compression format of two or more different conversion speeds can be converted to each other. Preferably, the first recording and reproducing device comprises a plurality of input/output ports for compressed digital video data according to the first image compression format. Then, a plurality of compressed digital video data according to the first image compression format can be output or input efficiently. Preferably, the second recording and reproducing means comprises a plurality of input/output ports for compressed digital video data according to the second image compression format. Then, a plurality of compressed digital video data according to the second image compression format can be output input efficiently.

Components in the system can be integrated as an apparatus. For example, a compressed video data processing apparatus comprises the digital video cassette recorder, the first recording and reproducing device and the image format converter. In a different example, a compressed video data processing apparatus comprises the first recording and reproducing device and the image format converter. Thus, a user can deal with video data easily without knowing conversion of image compression format. In these examples, the digital video cassette recorder is connected to the apparatus as an external component.

An advantage of the present invention is that the second recording and reproducing device as a main server can operate normally when video data of the first image compression format different from the image compression format thereof are recorded or reproduced after conversion of the image compression format.

Another advantage of the present invention is that video data can be transferred at a fast speed to the first recording and reproducing device.

A further advantage of the present invention is that a system can comprise components of various image compression formats.

BRIEF DESCRIPTION OF THE DRAWINGS

These and other objects and features of the present invention will become clear from the following description taken in conjunction with the preferred embodiments thereof with reference to the accompanying drawings, wherein.

DETAILED DESCRIPTION OF THE PREFERRED EMBODIMENTS

Figure 1:
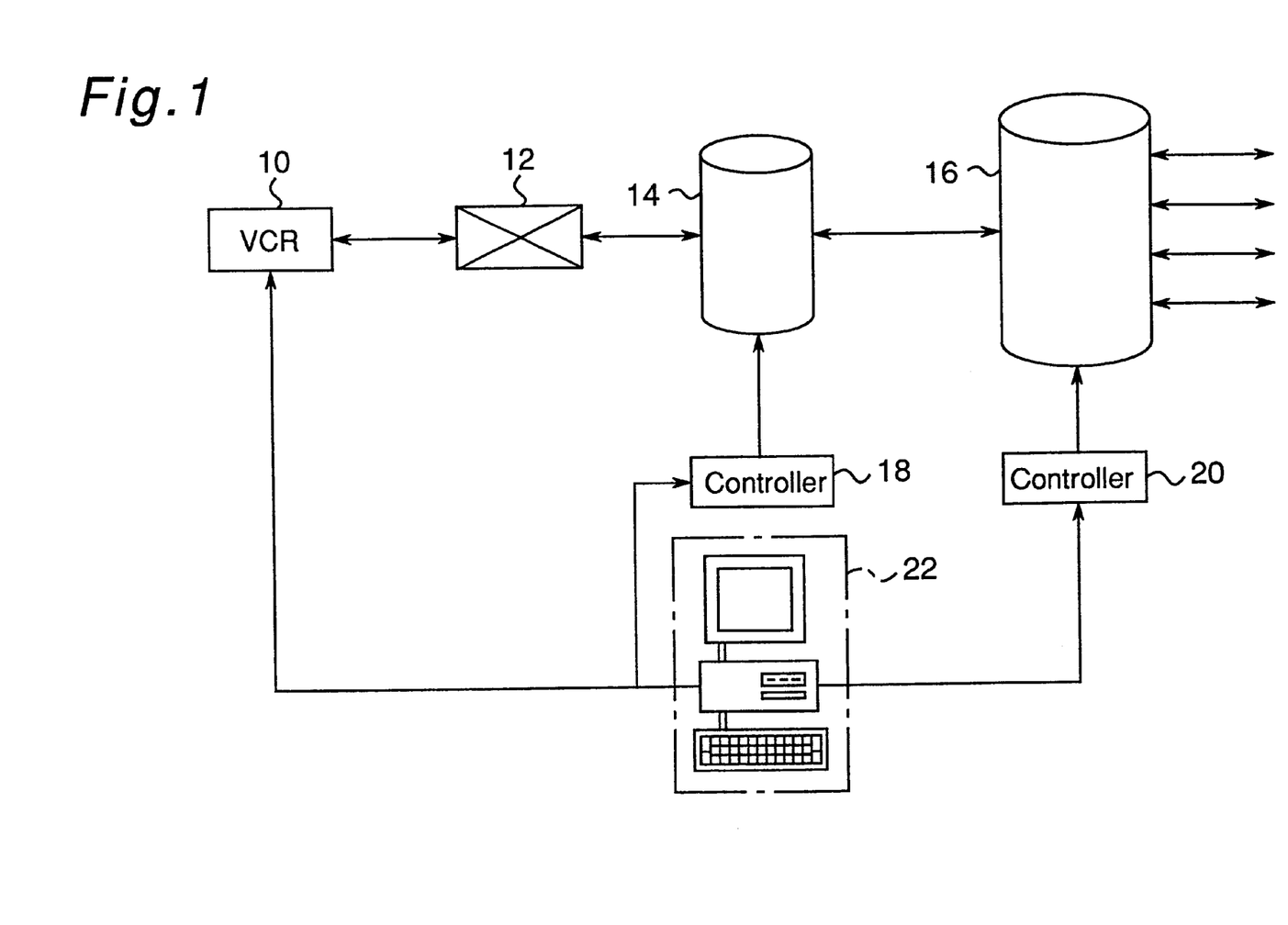
FIG. 1 is a block diagram of an video data processing system of a first embodiment according to the invention.

Referring now to the drawings, wherein like reference characters designate like or corresponding parts throughout the several views, FIG. 1 shows an video data processing system of a first embodiment according to the invention. In the system, a digital video cassette recorder 10 is connected through an image format converter 12 as an interface to a first recording and reproducing apparatus 14 having a large capacity storage device such as a hard disk and operating as a local server. The image format converter 12 converts a first image compression format (for example, DVCPRO as a kind of DV format), of video data of the digital video cassette recorder 10 to a second image compression format (for example, Motion-JPEG) of the first recording and reproducing apparatus 14, and vice versa. The first recording and reproducing apparatus 14 is connected through a network to a second recording and reproducing apparatus 16 having a large storage capacity device such as a hard disk and operating as a main server. Compressed video data are transmitted between the two apparatuses 14 and 16 in a network transmission format. The second recording and reproducing apparatus 16 is connected through a network to a plurality of external recording and reproducing apparatuses, and it may be accessed by a plurality of other image processors. The first recording and reproducing apparatus 14 is controlled by a first controller 18, while the second recording and reproducing apparatus 16 is controlled by a second controller 20. A main controller 22 comprising a personal computer, a monitor, a keyboard and the like controls the digital video cassette tape recorder 10 and the first and second controllers 18 and 20 in the total system by using control signals sent in serial transmission of RS 422A standard or the like. The controllers 18, 20 and 22 are known to a person skilled in the art, and they are not explained here further.

In the video data processing system shown in FIG. 1, digital video data of a moving picture of the first image compression format (for example, DVCPRO) are recorded and reproduced by the digital video cassette recorder 10 at normal speed. The image format converter 12 converts the received video data to video data according to the second image format without compression at normal speed. Then, the first recording and reproducing apparatus 14 as a local server stores the video data according to the second image format. It can edit video data of the moving picture. Then, the video data are transferred to the second recording and reproducing apparatus 16 as a main server, so that the video data can be accessed by other computers through the network. The two recording and reproducing apparatus 14 and 16 can process video data of the same image compression format.

In this system, when video data recorded in the digital video cassette recorder 10 is transferred to the first recording and reproducing apparatus 14, it is required that the video data has to be processed at the normal speed for converting the image compression format. Because the first recording and reproducing apparatus 14 as the local server is provided between the digital video cassette recorder 10 and the second recording and reproducing apparatus 16 as the main server, the main server operates normally even when it is accessed by many computers connected to the main server. Then, the video data can be transmitted normally to and from the digital video cassette recorder 10.

Next, the components 10–22 in the image processing system shown in FIG. 1 are explained. The digital video cassette recorder 10 records compressed digital video data of the first data compression format such as DVCPRO standard in a digital video cassette and reproduces compressed digital video data recorded in a digital video cassette with the first image compression format at normal speed.

The image format converter 12 receives compressed digital video data of the first image compression format reproduced at normal speed received from the digital video cassette recorder 10 and converts them to digital component serial data of SMPTE 259M standard without compression.

On the other hand, it converts digital component serial data of SMPTE 259M standard without compression to compressed digital video data of the first image compression format. Details of the image format converter 12 will be explained later with reference to FIGS. 2A and 2B.

The first recording and reproducing apparatus 14 includes a large capacity storage device such as a hard disk drive and operates as a local server. The apparatus 14 converts digital component serial data of SMPTE 259M standard received from the image format converter 12 to video data of a second image compression format such as Motion-JPEG and stores them. It can edit the stored data. Further, the compressed digital video data according to the second image compression format is sent to the second recording and reproducing apparatus 16 in a network transmission format such as ATM format or SDDI format. On the other hand, it can store compressed digital video data according to the second image compression format received from the second recording and reproducing apparatus 16 in the network transmission format. It reproduces video data as digital component serial data according to SMPTE 259M standard and sends them to the image format converter 12.

The second recording and reproducing apparatus 16 includes a large capacity storage device such as a hard disk drive and operates as a main server. The apparatus 14 stores as-received digital video data compressed according to the second image compression format received in the network transmission format from the first recording and reproducing apparatus 14. It also transmits the digital video data of the second image compression format through the network to other recording and reproducing apparatuses operating as main or local servers. When compressed digital video data stored in the: recording and reproducing apparatus 16 are used, a processing reverse to the above-mentioned one is carried out.

Figure 2A:
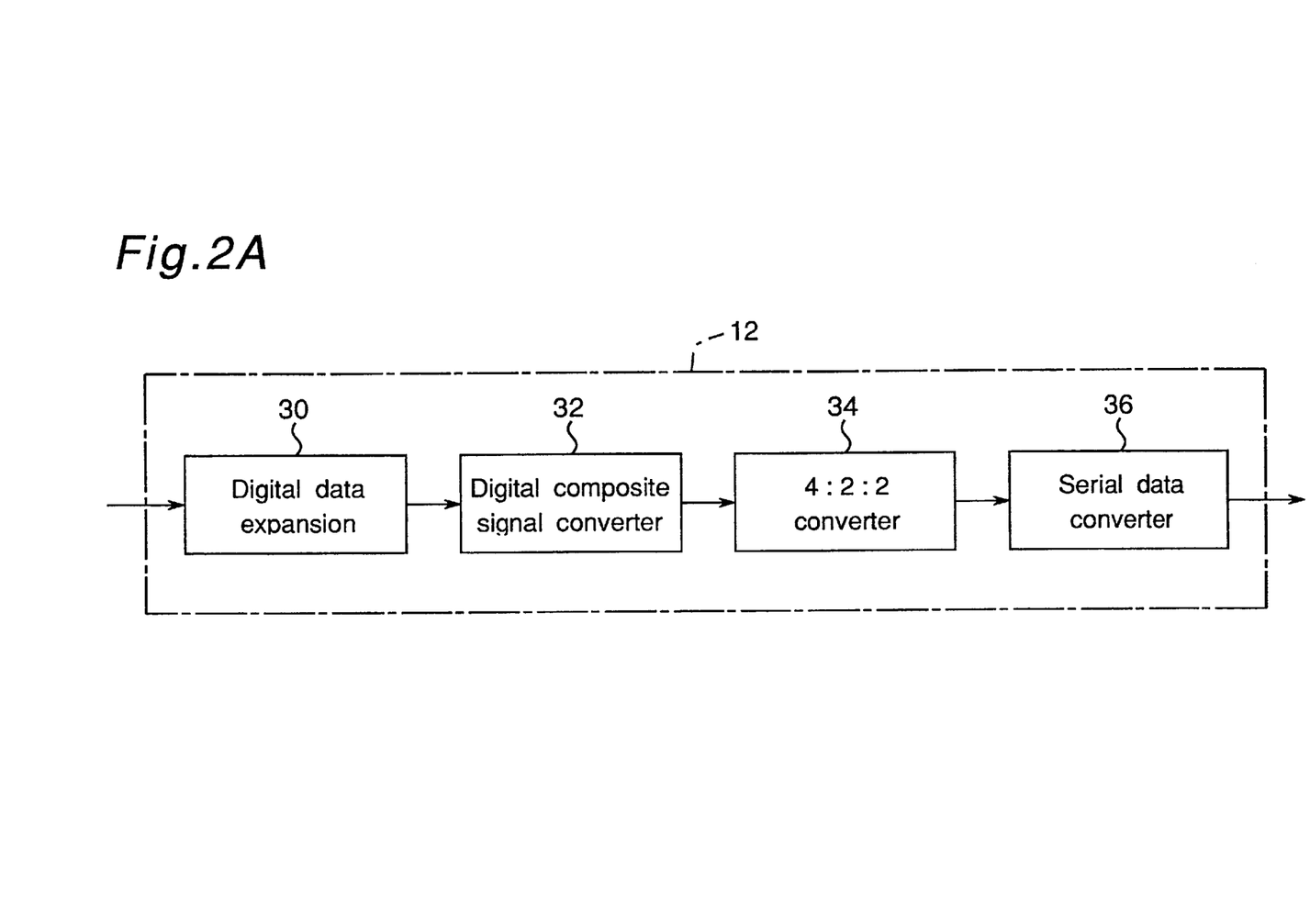
FIG. 2A is a block diagram of one part of the image format converter.

The image format converter 12 will be explained here. FIG. 2A shows an example of one part of the image format converter 12 for converting compressed digital video data of the first image compression format to digital component serial signals of SMPTE 259M standard. A digital data expansion circuit 30 expands compressed digital video data to non-compressed data. A first converter 32 converts the non-compressed data to digital composite signals. A second converter 34 converts the digital composite signals to 4:2:2 component signals. A third converter 36 converts the 4:2:2 component signals to digital component serial data of SMPTE 259M standard. In a modified example, the first converter 32 converts the non-compressed data to 4:1:1 component signals, and the second converter 34 converts the 4:1:1 component signals to 4:2:2 ones.

Figure 2B:
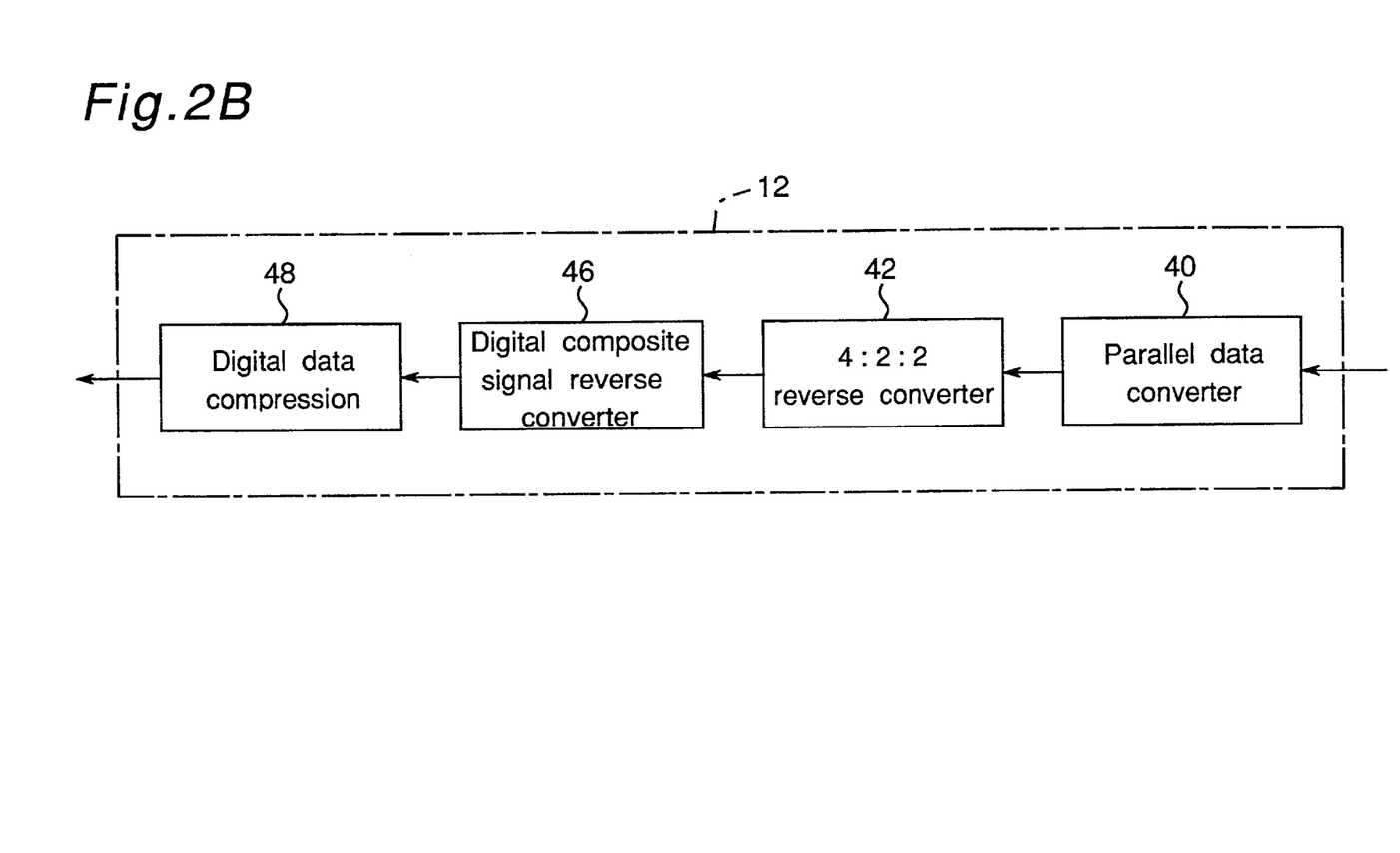
FIG. 2B is a block diagram of another part of the image format converter.

FIG. 2B shows an example of another part of the image format converter 12 for converting digital component serial signals of SMPTE 259M standard to compressed digital video data of the first image compression format. A fourth converter 40 converts digital component serial data of SMPTE 259M standard to 4:2:2 component signals. A fifth converter 42 converts the 4:2:2 component signals to digital composite signals. A sixth converter 44 converts the digital composite signals to video data. A digital data compression circuit 46 compresses the video data to compressed digital data. In a modified example, the fifth converter 42 converts the 4:2:2 component signals to 4:1:1 component signals, and the sixth converter 44 converts the 4:1:1 component signals to video data.

One problem of the above-mentioned video data processing system of the first embodiment is that the transfer speed of video data from the digital video cassette recorder 10 to the first recording and recording apparatus 14 cannot be increased because the image compression format has to be converted by the converter 12. The conversion of image compression format is needed because video data in the video cassette recorder 10 cannot be accessed by a computer or a server until the data compression format thereof is converted to the second data compression format. In the conversion, the transfer speeds of the compressed digital video data of the different image compression formats have to be kept the same. Therefore, if the transfer speed of the recording and reproducing apparatus 16 is normal speed, the compressed digital video data can be transferred only at normal speed. Therefore, the speed cannot be increased. Then, it is desirable to provide a video data processing system where video data can be transmitted fast between a digital video cassette recorder and a recording and reproducing apparatus processing the video data. Another problem of the system is that video data is deteriorated at the conversion of image compression format before they are edited in the first recording and reproducing apparatus 14.

Figure 3:
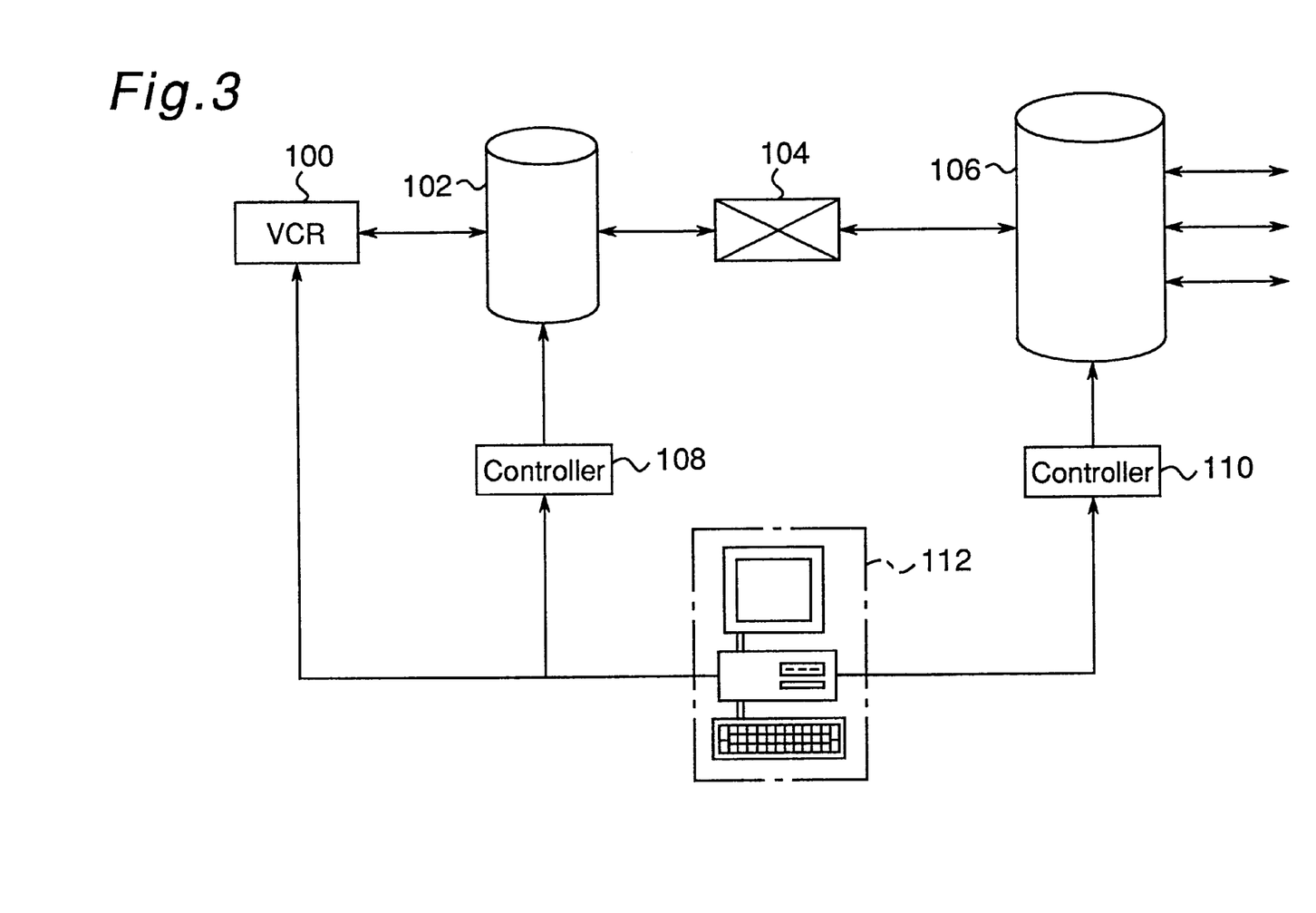
FIG. 3 is a block diagram of an video data processing system of a second embodiment according to the invention.

FIG. 3 shows a block diagram of a video data processing system of a second embodiment according to the invention which solve the above-mentioned problems. In contrast to the system of the first embodiment shown in FIG. 1, positions of a first recording and reproducing apparatus 102 and an image format converter 104 are different from the counterparts of the first embodiment. In the system shown in FIG. 3, a digital video cassette recorder 100 is connected to a first recording and reproducing apparatus 102 having a large capacity storage device such as a hard disk and operating as a local server. The first recording and reproducing apparatus 102 is connected through an image format converter 104 as an interface to a second recording and reproducing apparatus 106 having a large storage capacity device such as a hard disk and operating as a main server. The image format converter 104 converts video data format, a first image compression format (for example, Motion-JPEG), of video data in the first recording and reproducing apparatus 102 to a second image compression format (for example, DVCPRO). The second recording and reproducing apparatus 106 is connected through a network to a plurality of recording and reproducing apparatuses. Thus, the second recording and reproducing apparatus 106 may be accessed by a plurality of other computers. The first recording and reproducing apparatus 102 is controlled by a first controller 108, while the second recording and reproducing apparatus 106 is controlled by a second controller 110. A main controller 112 comprising a personal computer, a monitor, a keyboard and the like controls the digital video cassette tape recorder 100 and the first and second controllers 108 and 110 with control signals sent in serial transmission according to RS 422A standard. The controllers 108, 110 and 112 are known to a person skilled in the art, and they are not explained here further.

In the system explained above, video data of two or more different image compression formats are recorded and reproduced independently of transfer speed. The image transfer can be performed in two directions. For example, a user can transfer video data in a digital video cassette at four times speed in the system as if he or she operates a single recording and reproducing apparatus having a large capacity storage device of a single image compression format.

Next, the components 100–106 in the image processing system shown in FIG. 3 are explained. The digital video cassette recorder 100 records and reproduces compressed digital video data of a first image compression format (for example, DVCPRO) at four times speed. The recorder 100 records compressed digital video data of the first data compression format in a digital video cassette and reproduces compressed digital video data recorded in a digital video cassette with the first image compression format.

The first recording and reproducing apparatus 102 has a large capacity storage device such as a hard disk drive and it operates as a local server. The large capacity storage device is not limited to a hard disk drive. For example, it may comprise a semiconductor memory having a large capacity. The apparatus 102 is connected between the digital video cassette recorder 100 and an image format converter 104 and it is controlled by a first controller 108. The apparatus 102 can be operated at a plurality of speeds and it has a function of converting speed. It receives compressed digital video data according to the first image compression format by the digital video cassette recorder 100 at four times speed therefrom and records the data in the large capacity storage device. It reproduces compressed digital video data according to the first image compression format recorded in the large capacity storage device at normal speed. It can also reproduce compressed digital video data according to the first image compression format recorded in the large capacity storage device at four times speed and transmits them to the digital video cassette recorder 100. The first recording and reproducing apparatus 102 also has a function of editing compressed digital video data of the first image compression format. In contrast to the system shown in FIG. 1, video data to be edited are not deteriorated because edition is performed before the conversion of image compression format.

In this example, recording and reproducing speeds are normal speed and four times speed. However, various combinations are possible such as normal speed and normal speed, four times speed and two times speed, two times speed and normal speed, six times speed and normal speed.

The image format converter 104 is connected between the first large capacity recording and reproducing apparatus 102 and the second large capacity recording and reproducing apparatus 106 for converting digital image format. It receives compressed digital video data of the first image compression format from the large capacity recording and reproducing apparatus 102 and converts the digital compression format thereof to a second image compression format such as Motion-JPEG at normal speed. Further, it sends the digital image of the second image compression format to the second recording and reproducing apparatus 106 in a network transmission format such as asynchronous transfer mode (ATM) or SDDI format. On the other hand, it receives digital video data of the second image compression format from the second recording and reproducing apparatus 106 in a network transmission format and converts them to video data of the first image compression format to be sent to the first recording and reproducing apparatus 102. The image format converter 104 will be explained in detail later with reference to FIGS. 4A and 4B.

The second recording and reproducing apparatus 106 has a large capacity storage device such as a hard disk and it operates as a main server. The large capacity storage device is not limited to a hard disk. For example, it may comprise a semiconductor memory having a large capacity. The apparatus 106 is connected to the image format converter 104, and it stores as-received digital video data compressed according to the second image compression format in a network transmission format received from the image format converter 104. On the other-hand, it communicates through a network to other large capacity recording and reproducing apparatuses operating as main or local servers. It is controlled by the second controller 110. It also transmits the digital video data of the second image compression format to other large capacity recording and reproducing apparatuses operating as main or local servers. It also sends compressed digital video data of the second image compression format through the converter 104 to the first one 102 in a network transmission format.

Figure 4A:
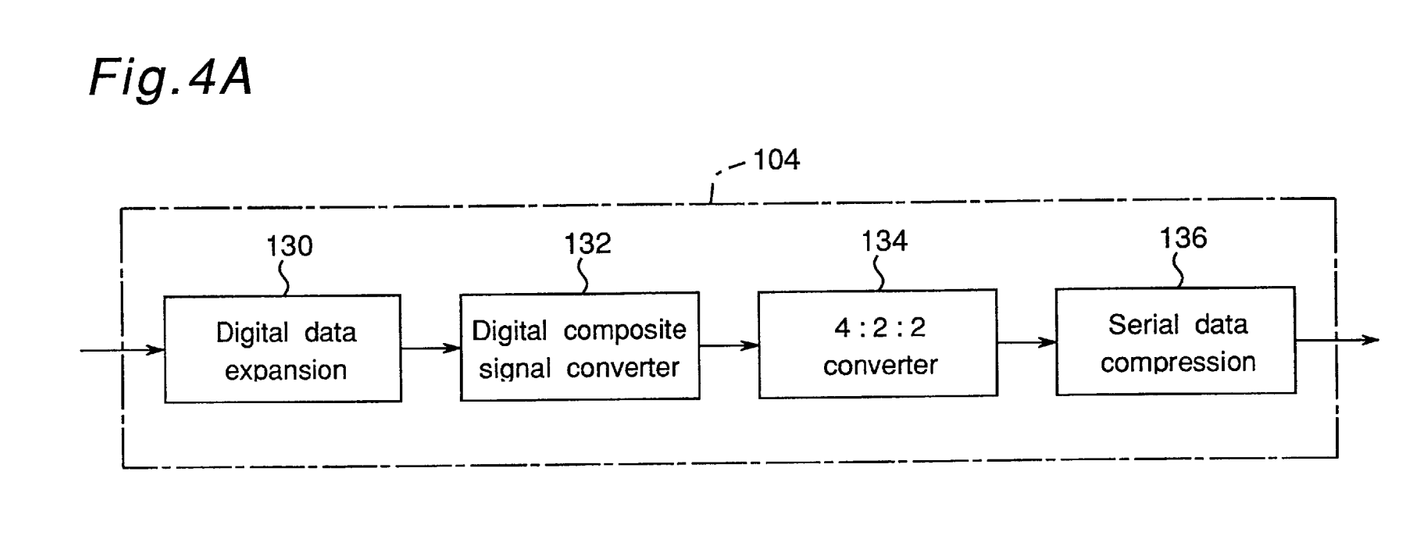
FIG. 4A is a block diagram of one part of the image format converter.

The image format converter 104 will be explained here further. FIG. 4A shows an example of a part of the image format converter 104 for converting compressed digital video data of the first image compression format such as DVCPRO to those of the second image compression format such as Motion-JPEG standard. A digital data expansion circuit 130 expands compressed digital video data to non-compressed data. A first converter 132 converts the non-compressed data to digital composite signals. A second converter 134 converts the digital composite signals to 4:2:2 component signals. A third converter 136 converts the 4:2:2 component signals to digital compression data of Motion-JPEG standard. In a modified example, the first converter 132 converts the non-compressed data to 4:1:1 component signals, and the second converter 134 converts the 4:1:1 component signals to 4:2:2 ones.

Figure 4B:
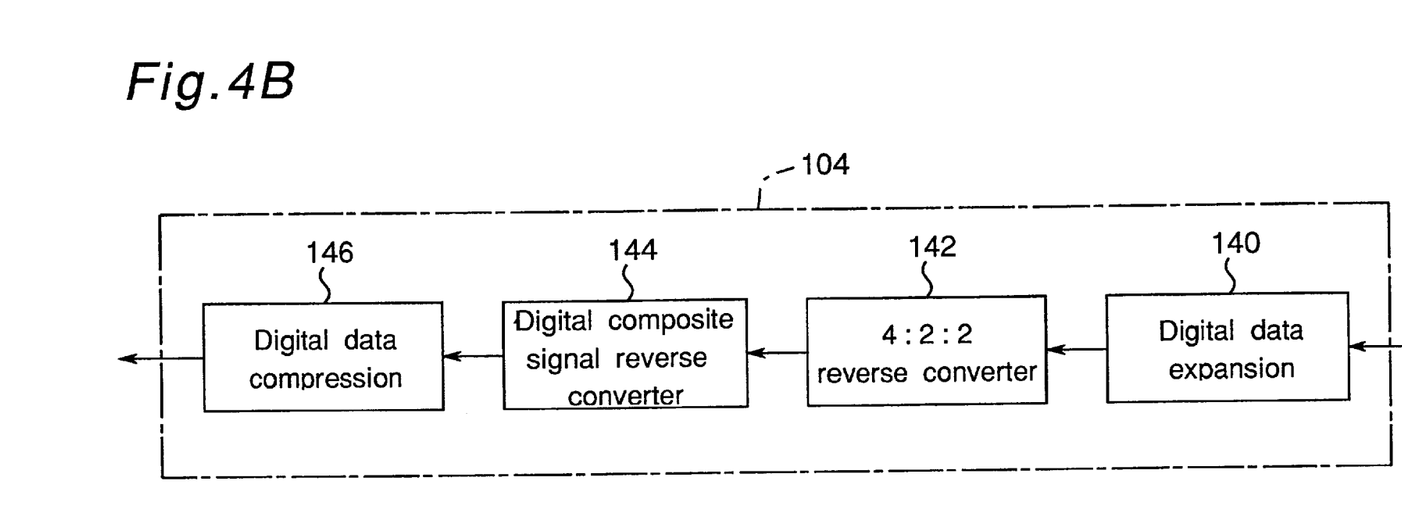
FIG. 4B is a block diagram of another part of the image format converter.

FIG. 4B shows an example of another part of the image format converter 104 for converting compressed digital video data of the second image compression format to compressed digital video data of the first image compression format. A fourth converter 140 converts compressed digital data to 4:2:2 component signals. A fifth converter 142 converts the 4:2:2 component signals reversely to digital composite signals. A sixth converter 144 converts the digital composite signals to video data. A digital data compression circuit 146 compresses the video data to compressed digital data of the first image compression format. In a modified example, the fifth converter 142 converts the 4:2:2 component signals to 4:1:1 component signals, and the sixth converter 144 converts the 4:1:1 component signals to video data.

Operation in this system is explained. When a moving picture as compressed digital video data is transferred to the recording and reproducing apparatus 106 as the main server, compressed digital video data recorded in a digital video cassette according to the first image compression format (DVCPRO) are reproduced by the digital video cassette recorder 100 at four times speed and recorded in the recording and reproducing apparatus 102 as the local server. It is a feature of this system that moving pictures recorded in a digital video cassette can be sent to the hard disk in the recording and reproducing apparatus 102 at a speed much faster than the normal speed used in the system shown in FIG. 1. If necessary, the picture data are edited by the recording and reproducing apparatus 102.

When the data stored in the first recording and reproducing apparatus 102 are transferred to the second recording and reproducing apparatus 106, the apparatus 102 reproduces the compressed digital video data according to the first image compression format at the normal speed different from the four times normal speed at the recorder 100, and the image format converter 104 as an interface converts them to compressed digital video data according to the second image compression format (Motion-JPEG) at the normal speed and sends them to the recording and reproducing apparatus 106 in a network transfer format. Thus, the apparatus 106 stores the compressed digital video data according to the second image compression format. Thus, the compressed digital video data according to the first image compression format received at four times speed are converted to those according to the second image compression format recorded at normal speed.

On the other hand, when compressed digital video data stored in the second recording and reproducing apparatus 106 is transferred, data flow is reversed. Compressed digital video data stored in the second recording and reproducing apparatus 106 is reproduced at normal speed to be sent to the image format converter 104 as an interface. The image format converter 104 converts them to compressed digital video data according to the first image compression format (DVCPRO) at the normal speed and sends them to the first recording and reproducing apparatus 102 to be stored at the normal speed. Then, the first recording and reproducing apparatus 102 stores compressed digital video data according to the first image compression format at four times speed to be transferred to the digital video cassette recorder 100. Thus, the recorder 100 records them at four times speed. Thus, the compressed digital video data according to the second image compression format reproduced at normal speed are converted to those according to the first image compression format to be sent at four times speed.

In the above-mentioned system, compressed digital signals from a recording apparatus such as a digital video cassette recorder can be received directly at the local server. Then, picture data in a digital video cassette recorder can be stored at a fast speed in the local server.

When compressed digital video data to be reproduced are converted and output, the speed of the output digital video data is determined independently of the speed of the compressed digital video data when they are reproduced. Then, when compressed digital recording data are converted and stored, the speed of the received digital video data is determined independently of the speed of the compressed digital video data when they are stored. Therefore, compressed digital video data can be input at a high speed. When compressed digital video data are converted and output, the transfer speed of the digital video data to be reproduced is determined independently of the transfer speed of the compressed digital video data when they are reproduced. Therefore, compressed digital video data can be output at a high speed.

By using the image format converter 104, compressed digital video data according to the first data compression format and those according to the second data compression format having different transfer speeds can be converted to each other. Then, a single system for recording and reproducing compressed digital video data can deal with two kinds of compressed digital video data according to the first and second data compression formats through the video cassette recorder and the main server use video data of different image compression formats. Therefore, a system can be constructed without problems even if components of different compression formats are included. Further, a cost of a system is decreased where video data processors are provided for each image compression format.

In the above-mentioned embodiments, the first image compression format is DVCPRO, but it may be other image compression format used in a digital video cassette recorder and the like. The second image compression format is Motion-JPEG, but it may be MPEG2 format.

Further, in the above-mentioned embodiment, N times speed of the video data according to the first image compression format is four times speed (N=4), while M times speed that of the video data according to the second image compression format is normal speed (M=1). However, various combinations of the two speeds can be adopted. For example, N=1, and M=1. However, in order to transfer the picture images in a digital video cassette recorder 100 to the first recording and reproducing apparatus 102 at a fast speed, it is preferable that $N \geq M$, or $N \geq 2$ and $M \geq 1$.

Figure 5:
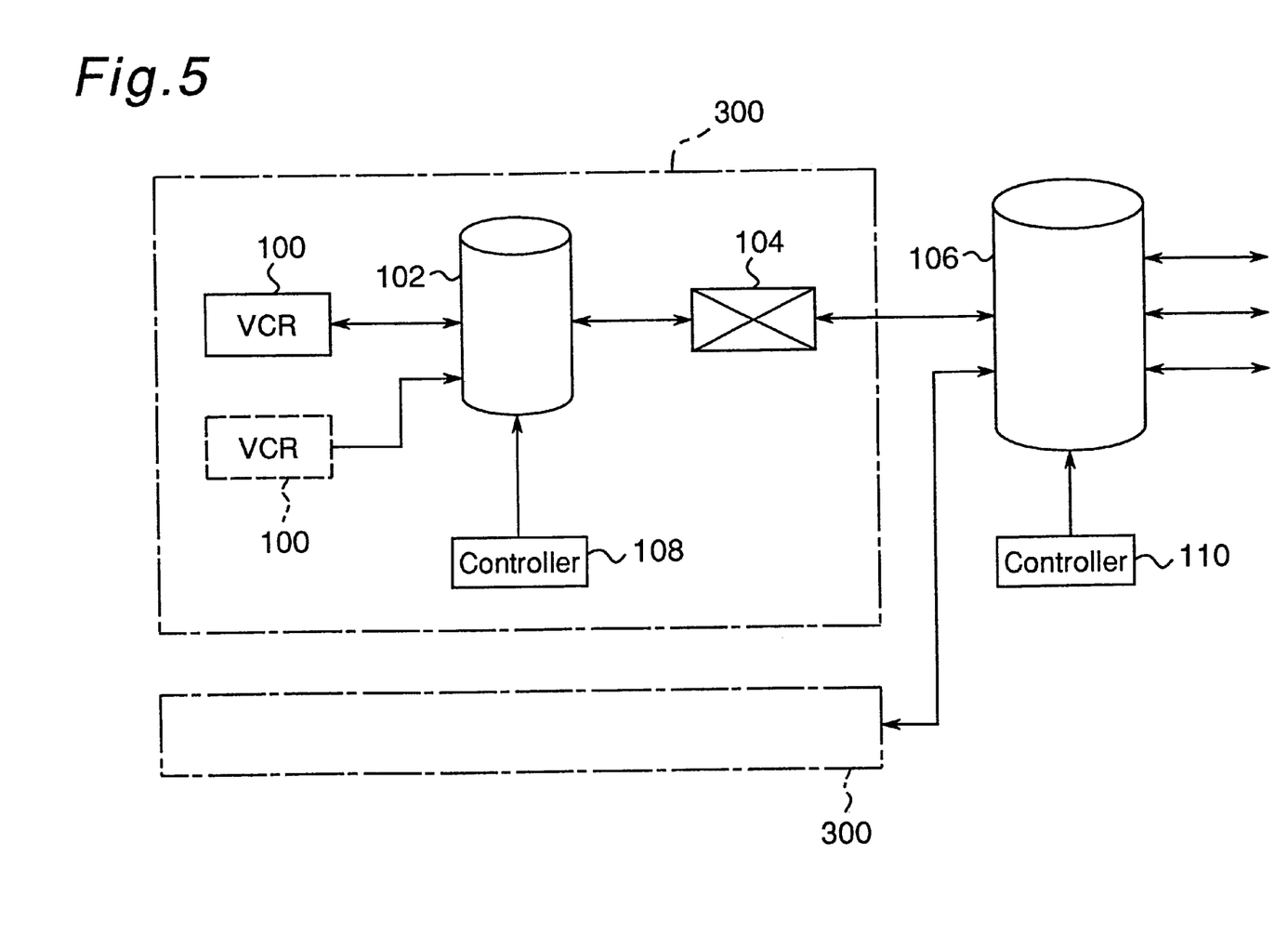
FIG. 5 is a block diagram of an apparatus for video data processing according to the invention.

Further, the digital video cassette recorder 100 may be integrated with the first recording and reproducing apparatus (local server) 102. FIG. 5 shows an example of an equipment 300 wherein a digital video cassette recorder (VCR) 100, a first recording and reproducing apparatus 102 with a controller 108 thereof, and an image format converter 104 are integrated. This equipment is connected to the second recording and reproducing apparatus 106 as a main server. The apparatus 102 operating as a local server has a large capacity storage device such as a hard disk drive. Because the video cassette recorder 100 is integrated with the first recording and reproducing apparatus 102, a user can process picture video data in a digital cassette without knowing the plurality of image compression formats.

The first recording and reproducing apparatus 102 may have a plurality of input and output portions, and a plurality of digital video cassette recorders 100 may be connected thereto, as shown in FIG. 5. In such a system, one of them can transfer compressed digital video data selectively to the first recording and reproducing apparatus 102. Dubbing may be performed between two of the plurality of digital video cassette recorders 100 through the first recording and reproducing apparatus 102. Because a plurality of digital video cassette recorder 100 are integrated with the first recording and reproducing apparatus 102, input and output of video signals can be performed efficiently for compressed digital video data according to a plurality of the first image compression formats. Thus, in a single video data processing apparatus, a user can process compressed digital video data according to the first and second image compression formats without knowing the difference in image compression format. Therefore, a disadvantage caused by a necessity of using a plurality of non-compatible image compression formats can be solved.

The second recording and reproducing apparatus 106 may have a plurality of input/output ports. Then, compressed digital video data can be input and output efficiently according to the second image compression formats.

Further, a plurality of the equipment 300 may be connected to the second recording and reproducing apparatus (main server) 106, as shown in FIG. 5. In this case, each equipment 300 may correspond to a different image compression format. Then, dubbing can be performed between the plurality of digital video cassette recorders 100 having different image compression formats and different speeds.

Figure 6:
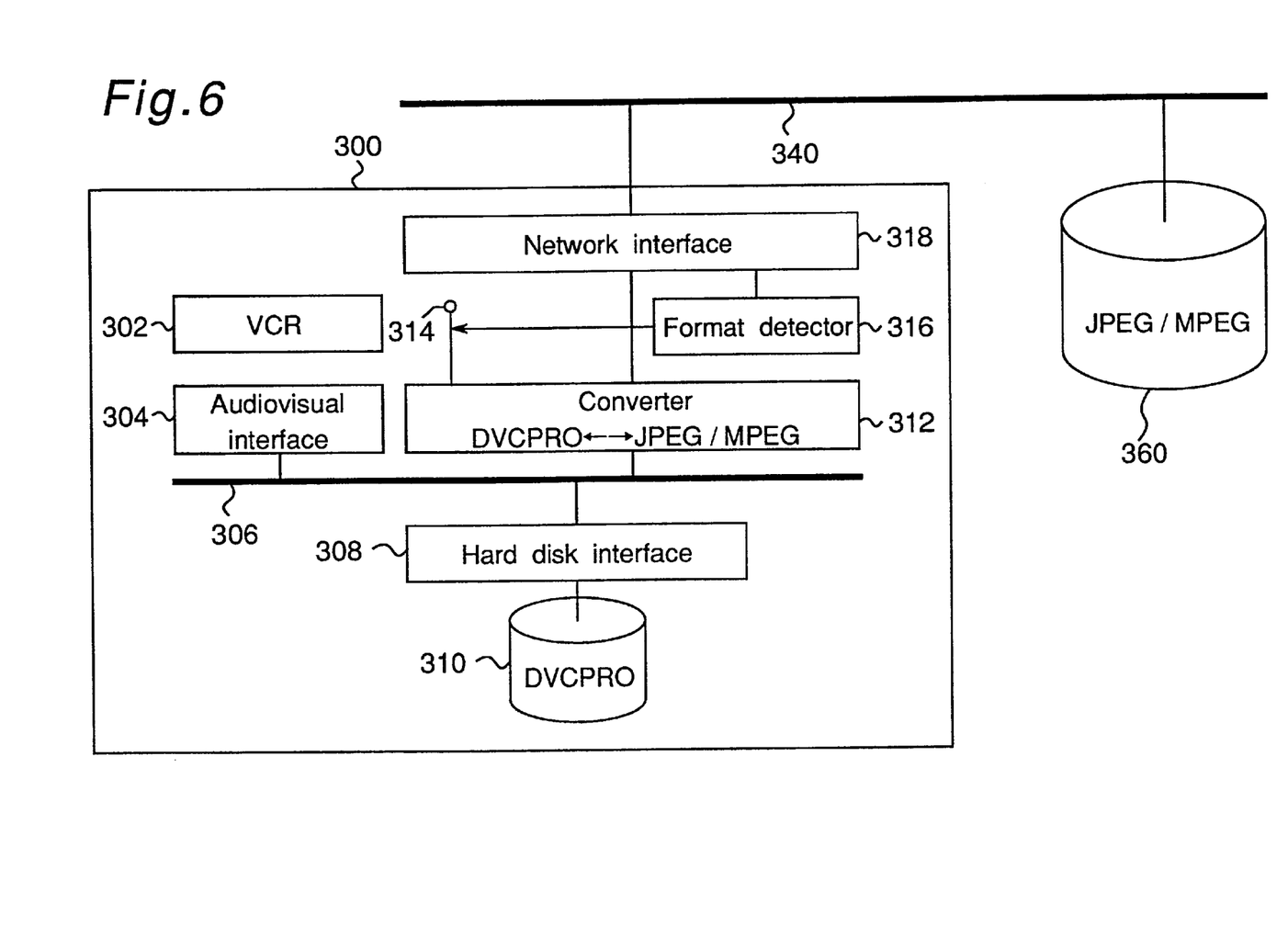
FIG. 6 is a block diagram of a VCR/network according to an example of the apparatus shown in FIG. 5.

FIG. 6 shows an example of the equipment 300. A digital video cassette producer (VCR) 302 records and reproduces compressed video signals. An audio-visual interface 304 sends output signals of the digital video cassette recorder 302 to an internal bus 306. A hard disk interface 308 records input signals in the internal bus 306 to hard disk 310 and reproduces output signals from the hard disk 310. A converter 312 converts input and output signals in the internal bus 306 to compression format of a main server 360. A control terminal 314 receives a control signal from a detector 316 which detects the compression format in order to change the compression format in the converter 312. The detector 316 analyzes signals from a network interface 318 to determine the compression format of the main server 360 and sends a control signal to the control terminal 314. The network interface 318 interfaces input and output signals to and from the converter 312 to a network 340. Signals are transferred through the network to and from the main server 360. For example, if the digital video cassette recorder 302 comprises a digital video cassette recorder for a consumer use (DV format) and the compression format of the main server 360 is MPEG, the detector 316 checks the compression format of the main server 360 in a communication through the network and controls the converter according to the result. If the compression format of the main server 360 is checked to be MPEG, the compressed data in the digital video cassette recorder 302 are converted to data of MPEG to be recorded in the main server 360. If the main server 360 comprises an MPEG system, ID signals are superposed in bit streams of MPEG. The detector 316 detects the ID signals and controls the control terminal 314 according to the result. Then, the converter 312 converts compressed signals of the digital video cassette recorder 302 of DV format to compressed signals of MPEG. A similar operation is performed if the compression format of the main server 360 is JPEG. Thus, signals can be interfaced with no problem even if the compression format of the recording and reproducing apparatus 310 is different from that of the main server 360.

Figure 7:
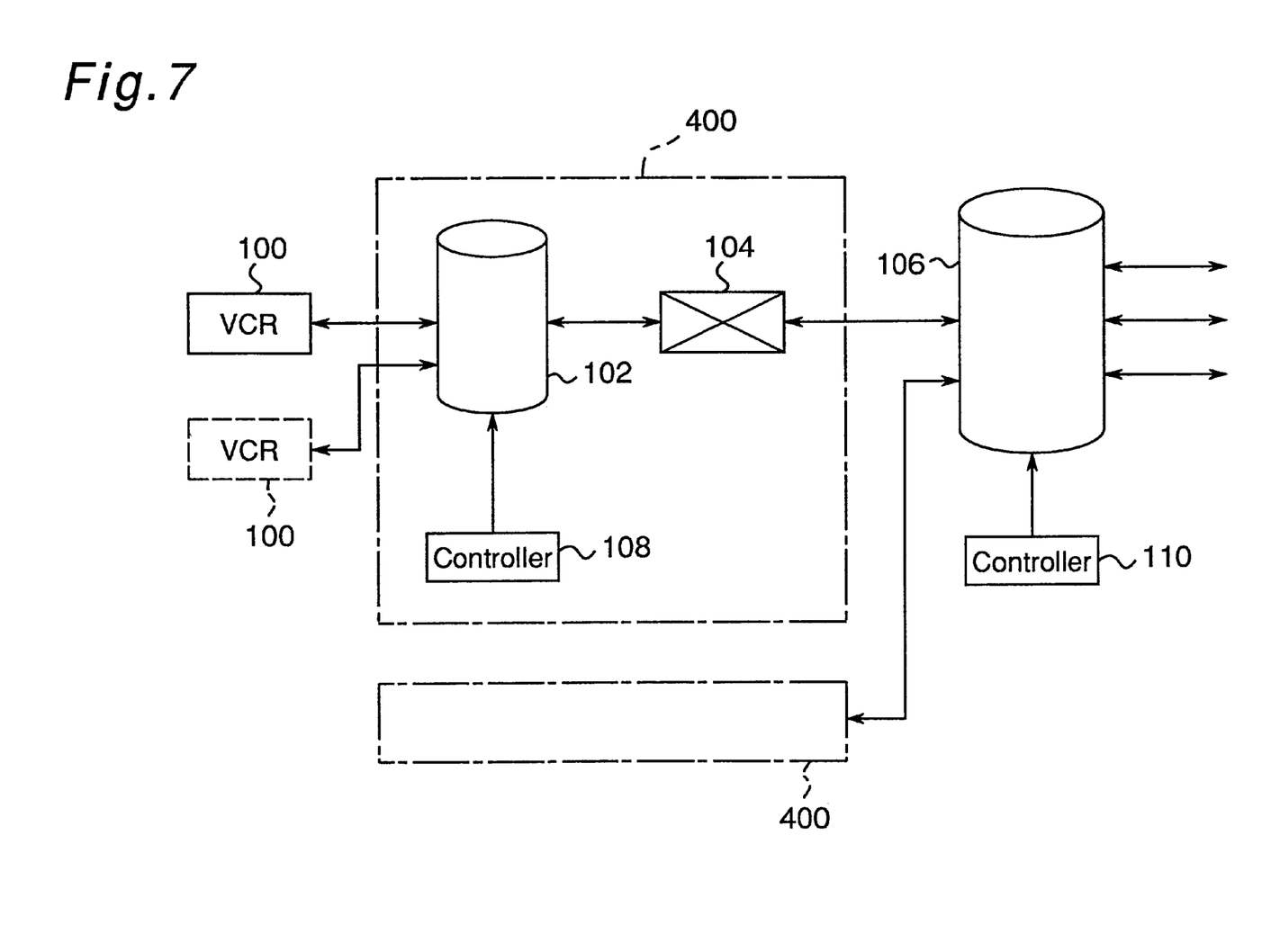
FIG. 7 is a block diagram of an apparatus for video data processing according to the invention.

FIG. 7 shows an example of another type of an equipment 400 wherein a first recording and reproducing apparatus 102 as a local server with a controller 108 thereof, and a converter 104 are integrated. The apparatus 102 operating as a local server has a large capacity storage device such as a hard disk drive This equipment 400 is connected between an external digital video cassette recorder 100 and the second recording and reproducing apparatus 106 as a main server.

Figure 8:
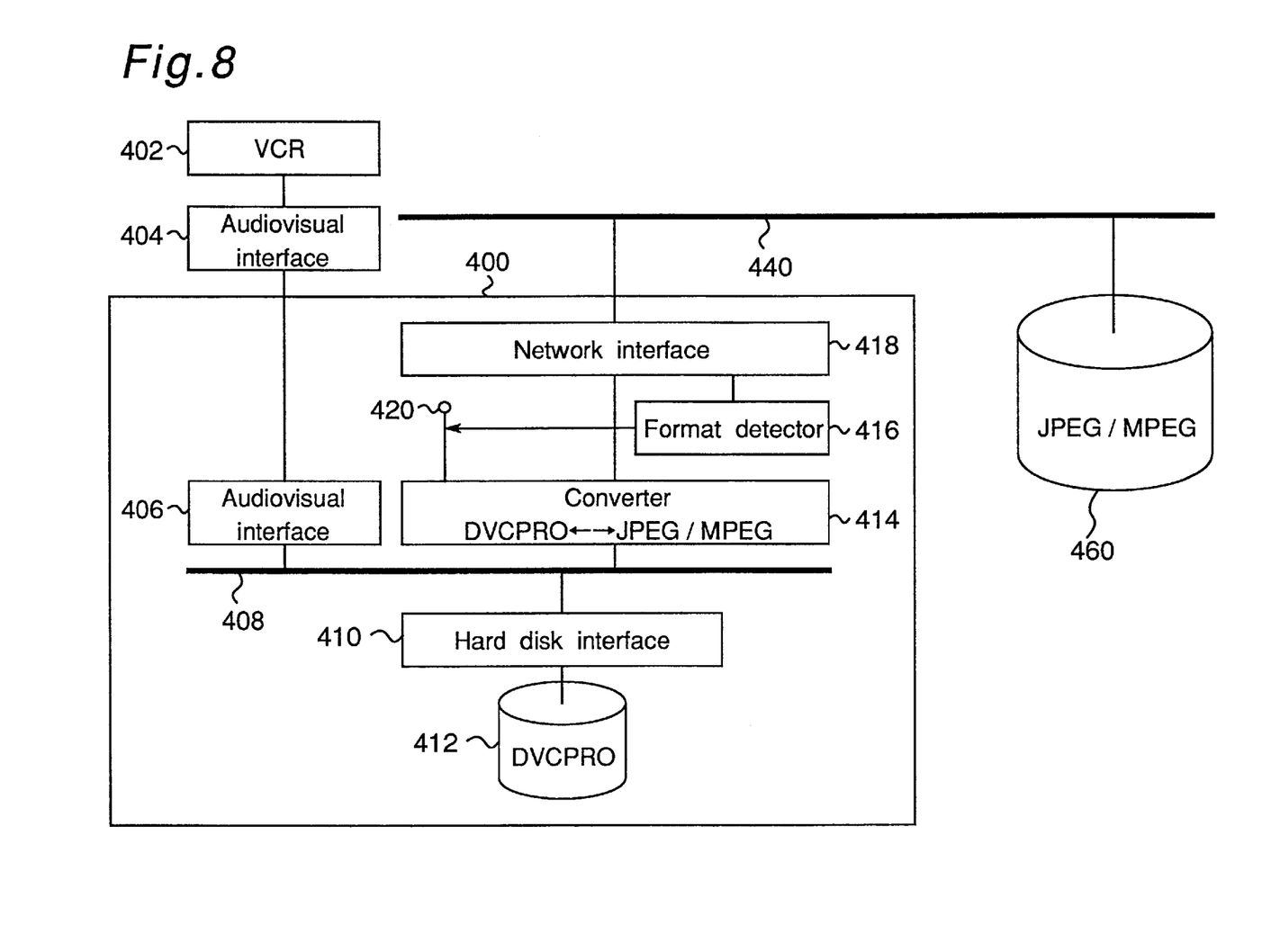
FIG. 8 is a block diagram of a VCR/network according to an example of the apparatus shown in FIG. 7.

FIG. 8 shows an example of the equipment 400. An external digital video cassette recorder (VCR) 402 for recording and reproducing compressed video signals is provided outside the equipment 400. Video signals are input and output through an audiovisual interface 404 to another audiovisual interface 406 provided in the equipment 400. The interface 406 sends output signals of the digital video cassette recorder 402 to an internal bus 408 in the equipment 400. A hard disk interface 410 records input signals in the internal bus 408 to a hard disk 4 12 and reproduces output signals from the hard disk 412. A converter 414 converts an image compression format of signals in the internal bus 408 to that of the main server (second recording and reproducing apparatus) 460 having a large capacity storage device such as a hard disk. A network interface 418 interfaces input and output signals to and from the converter 414 to a network 440. Signals are transferred through the network 440 to and from them main server 460. For example, if the digital video cassette recorder 402 comprises a digital VCR for a consumer use (DV format) and the compression format of the main server 460 is JPEG or MPEG, the compressed data in the VCR 402 are converted to data of JPEG or MPEG to be recorded in the main server 460. Equipment other than a digital video cassette recorder may also be connected if the audiovisual interface 406 supports such equipment, for example SCSI interface, IEEE 1394, fiber channel or the like. Thus, video signals can be interfaced with no problem even if the compression format of the data in the hard disk 412 is different from that of the main server 460.

Though compression formats used in the above-mentioned embodiments are a format for a digital video cassette recorder (DV format) and JPEG/MPEG for computer use, other compression formats can also be used similarly such as DVCPRO format of digital video cassette recorder for professional use, or fractal or wavelet format.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A compressed video data processing system comprising:
   a digital video cassette recorder operable to record and reproduce compressed digital video data according to a first image compression format;
   a first recording and reproducing device, including a storage device, operable to record and reproduce compressed digital video data according to a second image compression format that is different from the first image compression format;
   an image format converter, connected between said digital video cassette recorder and said first recording and reproducing device, operable to convert compressed digital video data between the first image compression format of said digital video cassette recorder and the second image compression format of said first recording and reproducing device;
   a second recording and reproducing device, including a storage device and being connected to said first recording and reproducing device, operable to record and reproduce compressed digital video data according to the second image compression format; and
   a controller operable to control said first recording and reproducing device, said second recording and reproducing device, and said digital video cassette recorder;
   wherein compressed video data is transferred between said digital video cassette recorder and said first recording and reproducing device through said image format converter at a first transfer speed, and compressed digital video data is transferred between said first and second recording and reproducing devices at a second transfer speed.

2. The system according to claim 1, wherein said second recording and reproducing device is operable to be connected through a network to an external processor, and wherein the second image compression format is a network transmission format.

3. The system according to claim 2, wherein said first recording and reproducing device is operable to edit the digital video data stored in said storage device of said first recording and reproducing device.

4. The system according to claim 2, wherein said controller comprises:
   a first unit operable to control said first recording and reproducing device;
   a second unit operable to control said second recording and reproducing device; and
   a main unit operable to control said digital video cassette recorder and said first and second units.

5. The system according to claim 2, wherein the network transmission format is one of an ATM format and an SDDI format.

6. The system according to claim 1, wherein said first recording and reproducing device is operable to edit the digital video data stored in said storage device of said first recording and reproducing device.

7. The system according to claim 1, wherein said controller comprises:
   a first unit operable to control said first recording and reproducing device;

a second unit operable to control said second recording and reproducing device; and a main unit operable to control said digital video cassette recorder and said first and second units.

8. The system according to claim 1, wherein the first and second non-zero transfer speeds are different.

9. A compressed video data processing system comprising:

a digital video cassette recorder operable to record and reproduce video data according to a first image compression format;

a first recording and reproducing device, including a storage device and being connected to said digital video cassette recorder, operable to record and reproduce compressed digital video data according to the first image compression format wherein said first recording and reproducing device transfers the digital video data at a first transfer speed with said digital video cassette recorder;

a second recording and reproducing device, including a storage device, operable to record and reproduce compressed digital video data according to a second image compression format that is different from the first image compression format at a second transfer speed determined independently from the first transfer speed;

an image format converter, connected between said first and second recording and reproducing devices, operable to convert compressed digital video data between the first image compression format of said first recording and reproducing device and the second image compression format of said second recording and reproducing device, wherein said first and second recording and reproducing devices transfer the digital video data between them through said image format converter at the second transfer speed; and a controller operable to control said first recording and reproducing device, said second recording and reproducing device, and said digital video cassette recorder.

10. The system according to claim 9, wherein the first transfer speed is faster than the second transfer speed.

11. The system according to claim 9, wherein said second recording and reproducing device is operable to be connected through a network to an external processor, and wherein the second image compression format is a network transmission format.

12. The system according to claim 11, wherein said first recording and reproducing device is operable to edit the digital video data stored in said storage device of said first recording and reproducing device.

13. The system according to claim 11, wherein said controller comprises:

a first unit operable to control said first recording and reproducing device;

a second unit operable to control said second recording and reproducing device; and a main unit operable to control said digital video cassette recorder and said first and second units.

14. The system according to claim 11, wherein the network transmission format is one of an ATM format and an SDDI format.

15. The system according to claim 9, wherein said image format converter is operable to support a plurality of conversion processes between the first image compression format and one of a plurality of the second image compression formats, and wherein said image format converter comprises a format detector operable to detect the second image compression format of said second recording and reproducing device and to select one of the conversion processes according to the second image compression format detected by said image format converter.

16. The system according to claim 9, wherein said first recording and reproducing device is operable to edit the digital video data stored in said storage device of said first recording and reproducing device.

17. The system according to claim 9, wherein said controller comprises:

a first unit operable to control said first recording and reproducing device;

a second unit operable to control said second recording and reproducing device; and a main unit operable to control said digital video cassette recorder and said first and second units.

18. The system according to claim 9, wherein the first and second non-zero transfer speeds are different.

* * * * *